(12) United States Patent
Dunn et al.

(10) Patent No.: US 8,806,865 B2
(45) Date of Patent: Aug. 19, 2014

(54) OCEAN WAVE ENERGY HARNESSING DEVICE

(75) Inventors: Kelly Dunn, Melbourne, FL (US); Deric Hausmann, Melbourne, FL (US); Stephen L. Wood, Melbourne, FL (US)

(73) Assignee: Florida Institute of Technology, Melbourne, FL (US)

( * ) Notice: Subject to any disclaimer, the term of this patent is extended or adjusted under 35 U.S.C. 154(b) by 155 days.

(21) Appl. No.: 13/282,327

(22) Filed: Oct. 26, 2011

(65) Prior Publication Data

US 2012/0102939 A1 May 3, 2012

Related U.S. Application Data (60) Provisional application No. 61/407,507, filed on Oct. 28, 2010.

(51) Int. Cl.
*F03B 13/14* (2006.01)
(52) U.S. Cl.
USPC ........................................................ 60/501
(58) Field of Classification Search
USPC ............. 60/398, 497–507; 290/42–43, 53–54
See application file for complete search history.

(56) References Cited

U.S. PATENT DOCUMENTS

| 882,888 | A | * | 3/1908 | Hillson | 215/324 |
|---|---|---|---|---|---|
| 917,411 | A | * | 4/1909 | Casella | 60/500 |
| 1,078,323 | A | * | 11/1913 | Trull | 417/332 |
| 3,310,294 | A | * | 3/1967 | Malm et al. | 366/67 |
| 4,118,932 | A | * | 10/1978 | Sivill | 60/500 |
| 4,309,152 | A | * | 1/1982 | Hagen | 417/218 |
| 4,392,349 | A | * | 7/1983 | Hagen | 60/500 |
| 4,686,377 | A | * | 8/1987 | Gargos | 290/53 |
| 6,476,511 | B1 | * | 11/2002 | Yemm et al. | 290/42 |
| 7,534,215 | B2 | * | 5/2009 | Saringer | 601/90 |
| 8,304,925 | B2 | * | 11/2012 | Yang et al. | 290/42 |
| 2002/0195823 | A1 | * | 12/2002 | Aguirre | 290/53 |
| 2008/0018115 | A1 | * | 1/2008 | Orlov | 290/54 |
| 2009/0084296 | A1 | * | 4/2009 | McCormick | 114/26 |
| 2011/0057448 | A1 | * | 3/2011 | Page | 290/53 |

* cited by examiner

*Primary Examiner* — Thomas Denion
*Assistant Examiner* — Shafiq Mian
(74) *Attorney, Agent, or Firm* — Stephen C. Thomas (57) ABSTRACT

A system for extracting long wavelength ocean wave energy and for extracting rotational wave energy uses a plurality of boom elements connected to at least one hinge element for movement about the hinge element in a direction of the vertical force of a wave and for movement about the hinge element in a direction of the transverse force of a wave, and the hinge element includes a shaft transverse to the boom elements with a blade mounted to the shaft for rotational movement of the shaft in the direction of the rotational force of a wave.

4 Claims, 6 Drawing Sheets

OCEAN WAVE ENERGY HARNESSING DEVICE

A claim for priority is made under 35 U.S.C. 119(e) for provisional patent application No. 61/407,507 filed 28 Oct. 2010

FIELD OF USE

Transfer of the energy present in ocean waves to electrical or mechanical energy.

BACKGROUND OF THE INVENTION

Energy in ocean waves and its extraction by conversion to alternate energy forms, is well known and has been the subject of continuing efforts.

The wave energy exists in two forms, in a traveling wave seen as displacing the ocean in a vertical movement as the wave is seen to move transversely to the vertical movement and in a circular or rotational movement and energy. This traveling wave energy is most noticeable as the wave energy reaches the shore producing "breakers." It may be seen off shore noticeable a "whitecaps," where the vertical movement of the ocean in a localized area, as displaced by the wave energy raises the water level relative to its immediate surrounding level, causing the level to collapse, producing the "whitecap."

The system for extracting traveling wave energy is known as the Pelamis Boom system. Vertical wave energy at or near the surface is commonly seen in long wavelength ocean swells. The Pelamis system operates by using hinged or rotatably linked parts placed in the path of the traveling wave energy. It bends or rotates about its links with the force of long wavelength waves and extracts energy from the vertical motion from these waves. As is well known, the vertical motion of the ocean wave imparts the same motion to linked parts, alternatively raising and lowering each of the linked part, in relation to adjoining linked parts, producing relative motion and displacement between the linked parts. The relative motion is convertible into hydraulic or electrical energy.

The system for extracting circular or rotational energy is known as the Salter's Duck. The Salter's Duck, as known, uses one or more blades optimally placed transverse to the rotational energy, to capture the force of the rotational energy in the form of the rotating or spinning blade. The rotational energy in the blade is captured, as is known, electrically by relative movement of a conductor in a magnetic field or by compression of a fluid, for example to operate a hydraulic device.

The use of the Pelamis system and the Slater's Duck System, have the disadvantages of inefficiencies from the circular wave energy on the Pelamis system and from the long wavelength wave energy on the Salter's Duck. For example, the Pelamis system is exposed to damage from the force of breakers or whitecaps, where the ocean is turbulent. Additionally the Salter's Duck may lose efficiency when exposed to rotational wave energy which is over the blades.

As may be understood from the following description of the disclosed invention, the disadvantages and inefficiencies of the separated Pelamis system and Salter's Duck system, may be overcome by combing the two systems.

SUMMARY OF THE INVENTION

The invention, as shown according to the disclosed inventive principles, in a preferred embodiment and according to a best mode, uses the Pelamis System for extracting long wavelength ocean wave energy with a Salter's Duck system, used to extract rotational or circular energy, incorporated into the linking elements of the Pelamis System. The combined Salter's Duck to the Pelamis System adds to the stability of the Pelamis System through the effect of the Salter's Duck stabilizing blades. The Pelamis System adds to the efficiency of the Salter's Duck by stabilizing its orientation to the circular energy in the traveling wave. By combining these two systems, the overall device can more fully extract the wave energy present. Off angle waves will act heavily on the Ducks which will act to contort the Pelamis body to a greater extent than normal. Likewise, the stability of the Pelamis body will allow the Salter's Duck to extract a greater amount of energy by providing a consistent platform for hydraulics to work against.

What is shown and described according to the disclosed in inventive principles is, a system for extracting long wavelength ocean wave energy and for extracting rotational wave energy, comprising, a plurality of boom elements extending in a longitudinal axis, at least one hinge element, the plurality of boom elements connected to at least one hinge element for movement about the hinge element in a direction of the vertical force of a wave or for movement about the hinge element in a direction of the transverse force of a wave, and wherein, the hinge element includes a shaft transverse to the boom elements longitudinal axis, and at least one blade mounted to the shaft for rotational movement of the shaft in the direction of the rotational force of a wave.

The system for extracting long wavelength ocean wave energy and for extracting rotational wave energy includes a plurality of blade elements, and wherein the plurality of boom elements are connected to at least one hinge element for movement about the hinge element in a direction of the vertical force of a wave and for movement about the hinge element in a direction of the transverse force of a wave, and including a transducer connected to the shaft and wherein the transducer is adapted to be displaced by the rotational movement of the shaft.

The system for extracting long wavelength ocean wave energy and for extracting rotational wave energy wherein the hinge element includes,
at least a first link element connected to the hinge element for the movement about the hinge element in the direction of the vertical force of a wave and at least a second link element connected to the hinge element for the movement about the hinge element in the direction of the transverse force of a wave.

The system for extracting long wavelength ocean wave energy and for extracting rotational wave energy including a first transducer connected to the first link element for displacement by the movement about the hinge element in the direction of the vertical force of a wave and a second transducer connected to the second link element for displacement by the movement about the hinge element in the direction of the transverse force of a wave The system for extracting long wavelength ocean wave energy and for extracting rotational wave energy wherein the first transducer includes a first hydraulic transducer, the first hydraulic transducer including a first transducer piston and a first transducer piston rod connected to the first link element, a second hydraulic transducer, the second hydraulic transducer including a second transducer piston and second transducer piston rod connected to the second link element, and wherein the movement about the hinge element in a direction of the vertical force of a wave is adapted to displace the first transducer piston and the movement about the hinge element in a direction of the transverse force of a wave, is adapted to displace the second transducer piston.

The system for extracting long wavelength ocean wave energy and for extracting rotational wave energy wherein the first link element includes opposed first link elements, the first hydraulic transducer includes a first hydraulic transducer pair, and wherein the first hydraulic transducer pair includes transducer piston rods connected to the opposed first link elements for alternative displacement, and wherein, the second link element includes opposed second link elements and the second hydraulic transducer includes a second hydraulic transducer pair, and wherein the second hydraulic transducer pair includes transducer piston rods connected to the opposed second link elements for alternative displacement.

The system for extracting long wavelength ocean wave energy and for extracting rotational wave energy including a crank handle connected to the shaft, and the transducer connected to the shaft is connected to the crank handle.

The system for extracting long wavelength ocean wave energy and for extracting rotational wave energy wherein the transducer connected to the shaft includes a hydraulic cylinder and piston rod, the piston rod is connected to the crank handle, whereby the piston rod is displaced by the rotational movement of the shaft.

The system for extracting long wavelength ocean wave energy and for extracting rotational wave energy including a cable connected to the hinge to at least, two points on the hinge, a hydraulic transducer including a hydraulic cylinder and hydraulic piston rod, the cable is connected to the hydraulic piston rod, and wherein the rotational movement about the hinge element in a direction of the vertical force of a wave or in the direction of the transverse force of the wave, is adapted to rotate the cable about the hinge and to alternatively pull the transducer piston rod and the transducer piston in a reciprocal motion.

The system for extracting long wavelength ocean wave energy and for extracting rotational wave energy including a pulley mounted on the hydraulic cylinder, and wherein the cable is connected from a first point on the hinge to the hydraulic piston rod and around the pulley and to a second point on the hinge.

The system for extracting long wavelength ocean wave energy and for extracting rotational wave energy, including a safe hinge element cover, the safe hinge element cover including a stationary hinge element cover mounted over the hinge element, a moving hinge element cover, the moving hinge element cover including a moving hinge element cover edge, the moving hinge element cover mounted on the hinge element for rotational movement about the stationary hinge element cover and wherein the moving hinge element cover is adapted to rotate relative to the position of the stationary hinge element cover, with the moving hinge element cover edge in contact with the stationary hinge element cover.

A system for extracting long wavelength ocean wave energy and for extracting rotational wave energy, comprising, a first means for converting the energy in ocean waves from the vertical force in the wave or a second means for converting the energy in ocean waves from the transverse force in the wave, and third means for converting the energy in ocean wave from the rotational force in the wave.

The system for extracting long wavelength ocean wave energy and for extracting rotational wave energy wherein the first or second means includes means for moving a transducer in response to the vertical force in the wave or in response to the transverse force in the wave, and means for moving a transducer in response to the rotational force in the wave.

A system for extracting long wavelength ocean wave energy and for extracting rotational wave energy, comprising, a plurality of boom elements extending in a longitudinal axis, at least one hinge element, the plurality of boom elements connected to the at least one hinge element for movement about the hinge element in a direction of the vertical force of a wave or for movement about the hinge element in a direction of the transverse force of a wave, and wherein, the hinge element includes a shaft transverse to the boom elements longitudinal axis, at least one blade mounted to the shaft for rotational movement of the shaft in the direction of the rotational force of a wave, and wherein the shaft is adapted for rotational movement by the blade, in the direction of the rotational force of a wave.

The system for extracting long wavelength ocean wave energy and for extracting rotational wave energy including a transducer connected to the shaft and a transducer connected to the shaft for movement by the rotational movement of the shaft.

The system for extracting long wavelength ocean wave energy and for extracting rotational wave energy where the at least one blade includes a plurality of blades mounted to the shaft.

BRIEF DESCRIPTION OF THE DRAWINGS

FIG. 3, shows in three (3) views, 3a, 3b, and 3c, an alternate Pelamis boom element and the arrangement of transducers for transferring the movement of the Pelamis Boom elements to mechanical energy.

FIG. 4, shows in three (3) views, 4a, 4b, and 4c, a hinge assembly combining transducers for converting movement of the Pelamis Boom elements with movement of the Salter's Duck elements.

FIG. 5, shows in two views 5a and 5b, a hinge cover and in an exposed view, the mechanical connection for converting the rotational motion of the Salter's Duck blades to mechanical energy.

FIG. 6, shown in three (3) top views, the motion of the Pelamis Booms about a common hinge with rotating Salter's Duck blades.

DESCRIPTION OF THE INVENTION

Figure 1:
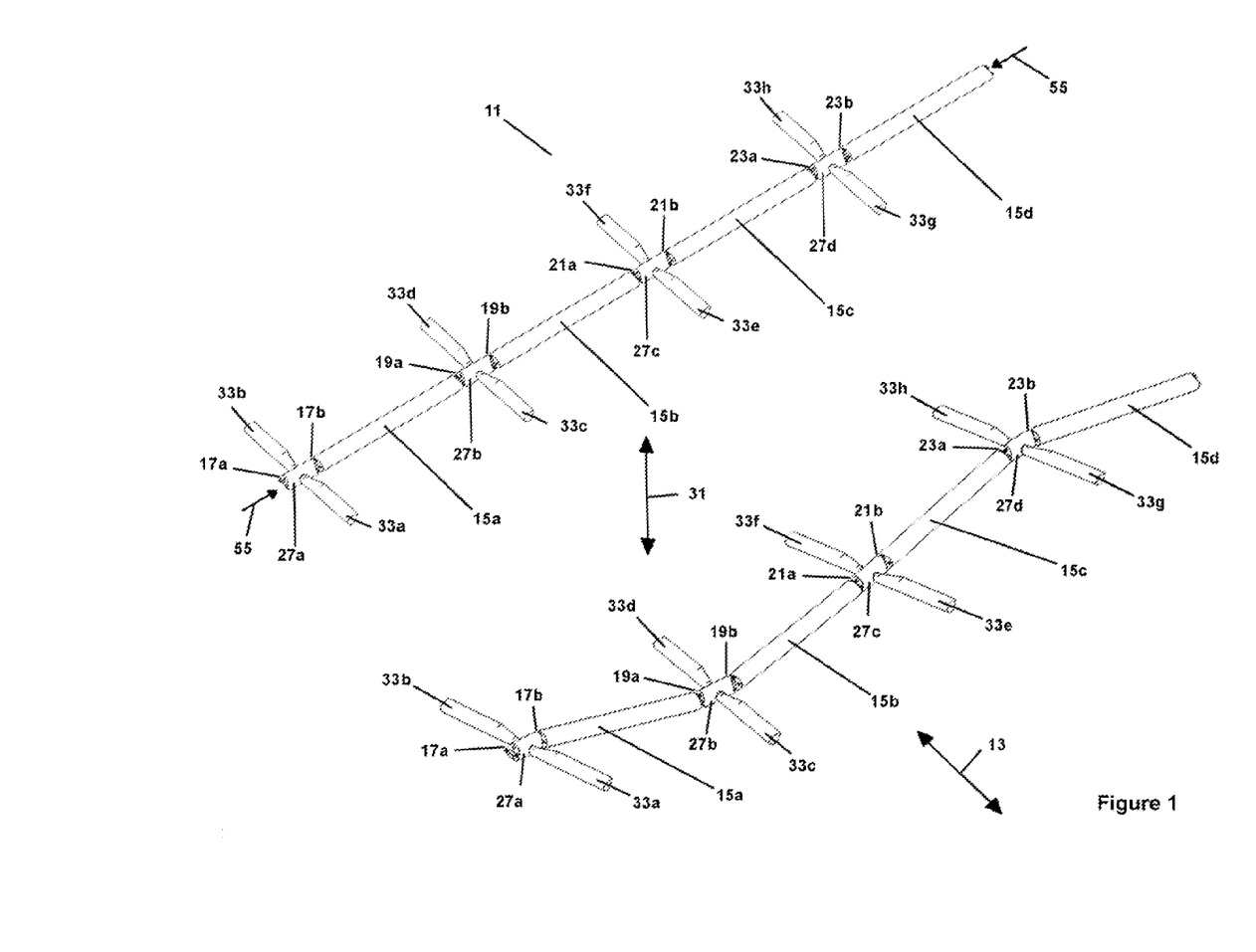
FIG. 1, shows in two views, the arrangement of the Pelamis Boom elements joined with Salter's Duck elements and under motion from the force of a transverse wave with vertical forces exerted on the Pelamis Boom elements.

The Pelamis System as is known and understood by those skilled in the art, is shown in FIG. 1, in two views, at rest generally by numeral 11 and in motion under the force of a transverse wave, shown generally by numeral 13. The moving parts of the Pelamis System are shown by boom elements 15a, 15b, 15c, and 15d, Salter's Duck Pelamis System hinge elements 27a-d and Salter's Duck Blade pairs 33 a-b, 33 c-d, 33 e-f, and 33 g-h. As would be known and understood by those skilled in the art, the number of Pelamis system boom elements shown is not restrictive but may be expanded to any suitable number of boom elements, according to the disclosed inventive principles.

The Pelamis System boom elements 15 a-d are linked at respective joints 17 a-b, 19 a-b, 21a-b, 23 a-b, to respective Salter's Duck hinge elements shown by numerals 27 a-d, shown with respective blade pairs 33 *a-b*, 33 *c-d*, 33 *e-f*, and 33 *g-h*. As shown, in FIG. 1, joint 17*a* in Salter's Duck Hinge element 27*a* is shown without a link to an adjoining Pelamis boom element but as would be understood by those skilled in the art, a Pelamis Boom Element may be added to the Pelamis System as shown for elements 15 *a-d*.

The Salter's Duck hinge elements, for example 27*a-d*, in the preferred embodiment as shown in FIG. 1 are shown for purposes of explanation in FIGS. 2 to 6 and in preferred embodiments to provide hinges for vertical or transverse rotational movement of the respective connected Pelamis System Boom Elements 15 *a-d*, relative to the Salter's Duck hinge elements 27*a-d* and structure to support the Salter's Duck Blade pairs 33*a-b*, 33 *c-d*, 33 *d-f*, and 33 *g-h*, and the associated transducers for converting the energy in the movement of the Pelamis System Boom Elements and the Salter's Duck Blade Pairs into a different form of energy, for example, compressed air or fluid, or electrical energy.

As shown in FIG. 1, the Pelamis System boom elements 15 *a-d* are displaced under the force of a wave 13, for example by the vertical force in the vertical directions of arrow 31. Wave 13, and wave 34 shown in FIG. 2, as would be understood by those skilled in the art, while appearing to move transversely, causes the Pelamis Boom Elements 15 *a-d*, to move vertically as shown by arrow 31 in FIG. 1.

The Salter's Duck Blade pairs 33 *a-b*, 33 *c-d*, 33 *e-f*, and 33 *g-h*, are shown mounted transverse to respective Salter's Duck hinge elements 27 *a-d*. A representative Salter's Duck hinge element 27*d*, is shown in detail in FIG. 2.

Figure 2:
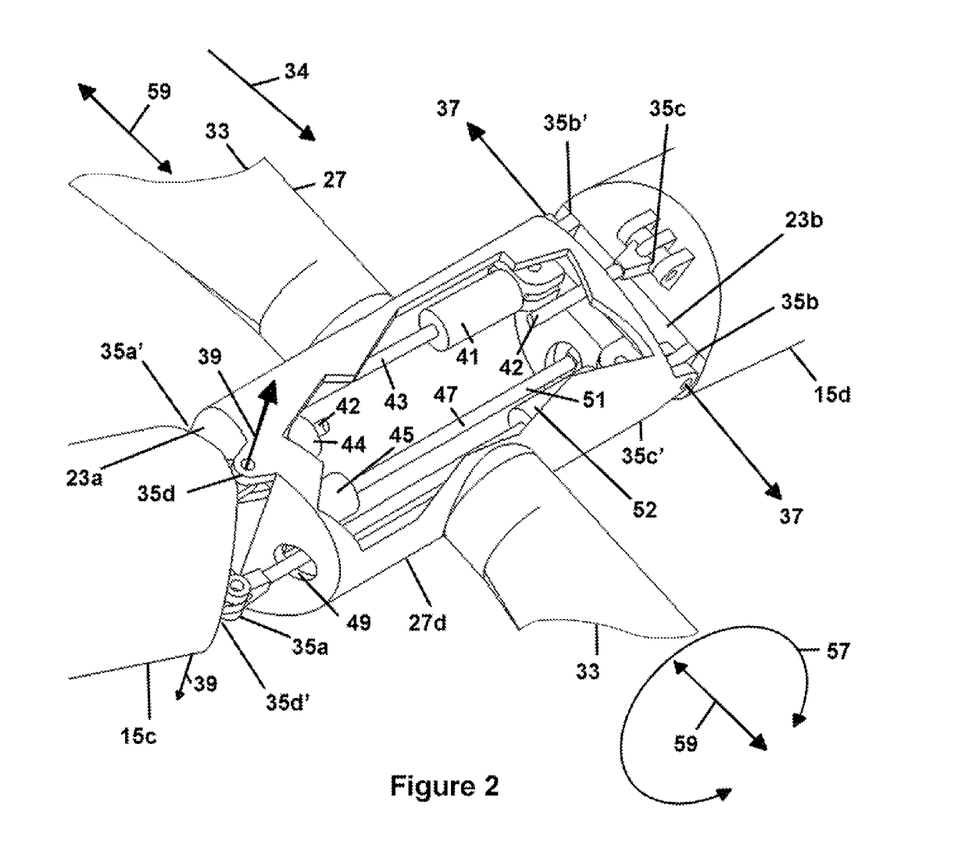
FIG. 2, shows the interior of the hinge elements joining the Pelamis Boom elements and the transducers for transferring the movement of the Pelamis Boom elements to mechanical energy.

As shown and disclosed in FIG. 2, for a preferred embodiment and in a representative view of Salter's Duck hinge element 27*d*, the hinged element links, shown as 23*a* in FIG. 1, are shown in FIG. 2, for purpose of explanation, by hinge link elements 35*a*, 35*a*' (hinge link element 35*a*' shown hidden but as would be understood by one skilled in the art, is opposed to hinge link element 35*a*), 35*d*, 35*d*' (35*d*' shown hidden but as would be understood by one skilled in the art, is opposed to hinge link element 35*d*), joining Salter's Duck Element 27*d* to Pelamis System Boom Element 15*c*. Hinge link elements 35*a*, 35*a*' permit relative rotation about the axis shown by arrow 39 through hinge link elements 35*d*, 35*d*'.

As shown and disclosed in FIG. 2, for a preferred embodiment and in a representative view of Salter's Duck hinge element 27*d*, the hinge element links, shown as 23*b* in FIG. 1, are shown in FIG. 2, for purpose of explanation, by numerals 35*b* and 35*b*' (hinge link element 35*b*' shown hidden but as would be understood by one skilled in the art, opposed to hinge link element 35*b*), and hinge link elements 35*c* and 35*c*' (hinge link element 35*c*' shown hidden but as would be understood by one skilled in the art, is opposed to hinge link element 35*c*), with hinge link elements 35*b* and 35*b*' and 35*c* and 35*c*', joining Salter's Duck element 27*d* to Pelamis Boom Element 15*d*. Hinge link elements 35*b* and 35*b*' and 35*c* and 35*c*', permit relative rotation about the axis shown by arrow 37.

As shown for a preferred embodiment, the relative movement of Pelamis System Boom Elements 15*c* andl 5*d*, are converted into mechanical energy by transducers 41, and 52 (partially shown), and 44 and 45 (partially shown). The transducer shown in a preferred embodiment, as hydraulic cylinder 41 is connected by piston rod 43 to a hinge link element 35*a*' (hidden but as would be understood by those skilled in the art, is opposed to hinge 35*a*). The transducer shown as hydraulic cylinder 45 is shown connected by piston rod 47 to hinge link element 35*c*' (not shown but understood by those skilled in the art is opposed to hinge link element 35*c*). The transducer shown as hydraulic cylinder 44 is shown connected by piston rod 42 (shown in a partial view) to hinge 35*c*. The transducer shown by numeral 52 is shown connected to by piston rod 49 to hinge link element 35*a*.

As would be known to those skilled in the art, the positions of the transducers 41 and 52, and 44, and 45 may be changed by reversing their respective orientation with respect to the opposed Pelamis System Boom Elements or by varying the way or manner the transducers convert the motion of the Pelamis System Boom Elements or the Salter's Duck Blade pairs, into energy in a different form, for example by electrical energy. For example, according to the disclosed inventive principles, the motion of the rods 42, 43, 47, 51, may be used to convert the mechanical displacement of the rods into electrical energy, as would be known to those skilled in the art.

As would be understood by those skilled in the art, relative movement of Pelamis Booms 15*c* and 15*d*, to the Salter's Duck element 27*d*, for example under the transverse and vertical forces of a wave in the direction shown by arrow 13 and 31, as shown in FIG. 1, causes the piston rods 43 and 47 to be displaced alternatively, and piston rods 42 and 49 to be displaced alternatively, and for a preferred embodiment, compressing the fluid in cylinders 41 and 52 and in 44 and 45.

Figure 4A:
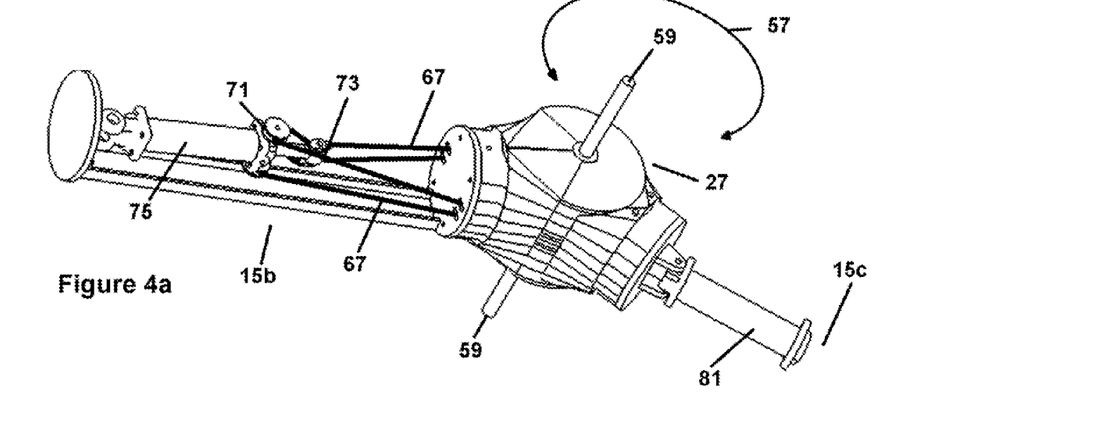
Figure 4B:
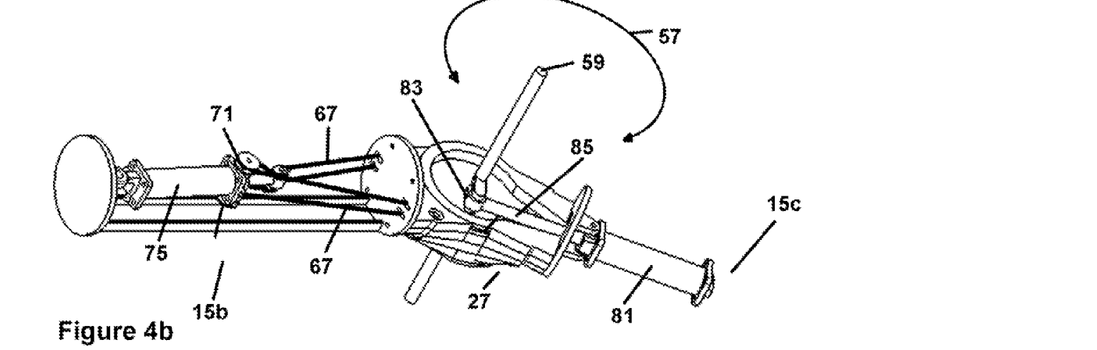
Figure 4C:
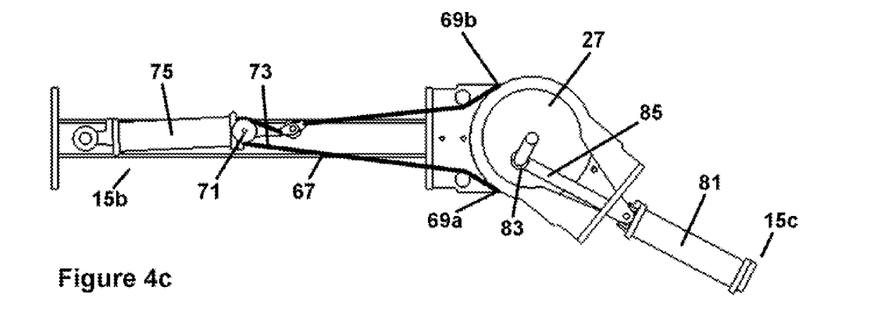
Figure 5A:
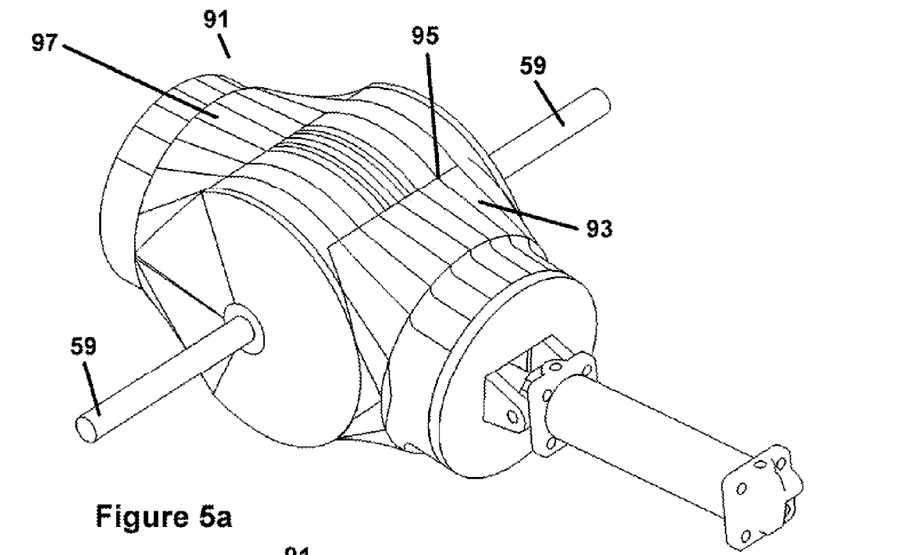
Figure 5B:
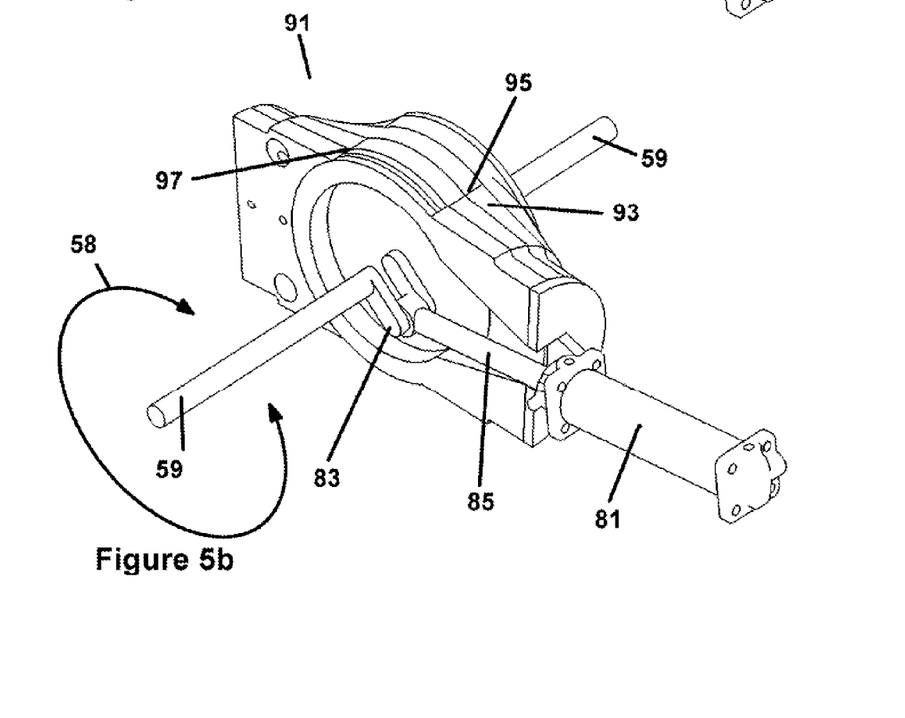
Figure 6A:
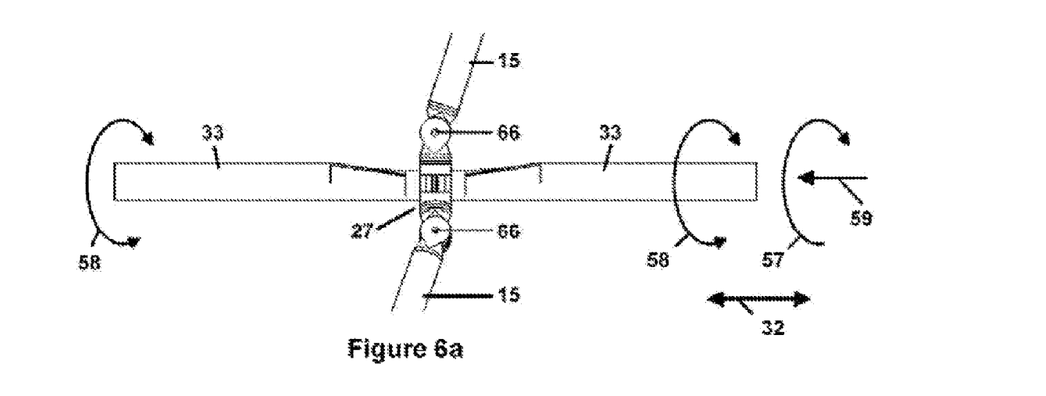
Figure 6B:
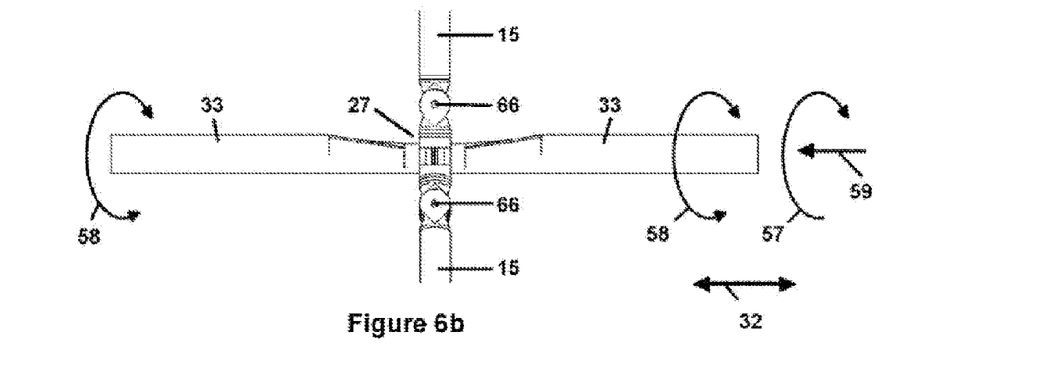
Figure 6C:
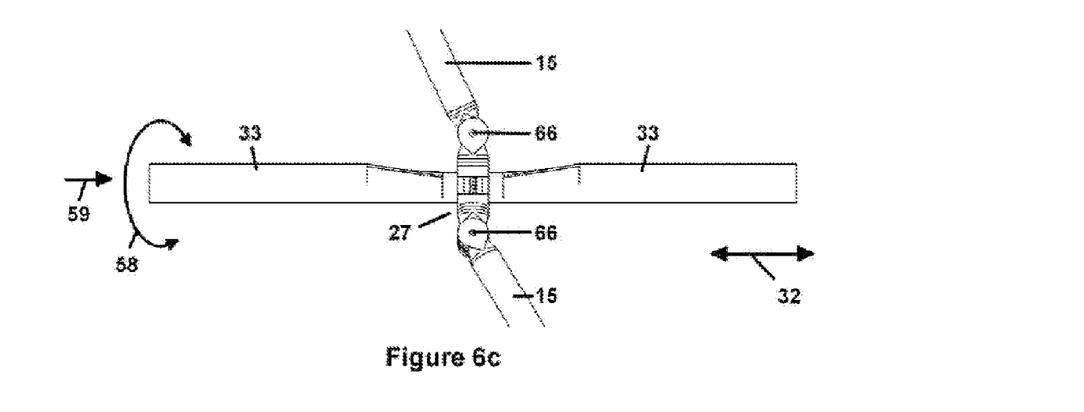

As shown in FIG. 1, and in particular in FIGS. 2, 4 *a-c*, 5 *a-b*, and 6 *a-c*, The Salter's Duck blades 33 are shown mounted to the Salter's Duck element 27*d* for FIG. 2, or 27 for FIGS. 4 *a-c* and FIG. 6 *a-c*, for circular rotation 57 about an axis 59 transverse to the longitudinal axis 55 of the Pelamis System, as shown in FIG. 1, by the longitudinal length of the boom elements 15*a* to 15*d*, by numeral 55 in FIG. 1.

Figure 3A:
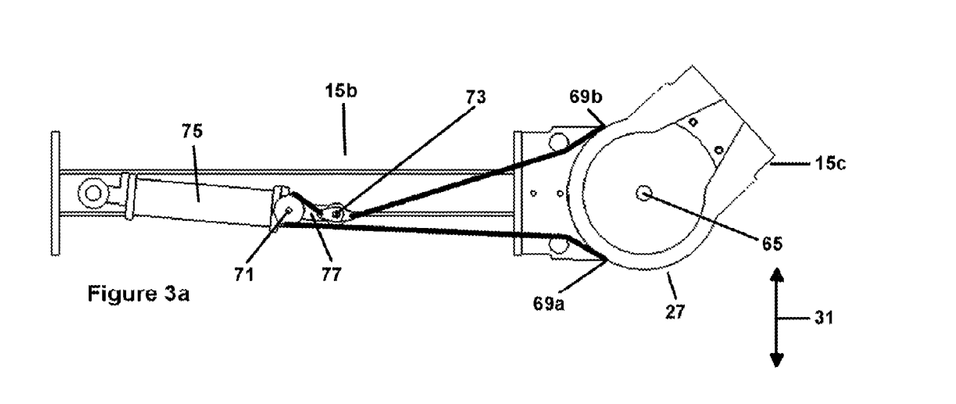
Figure 3B:
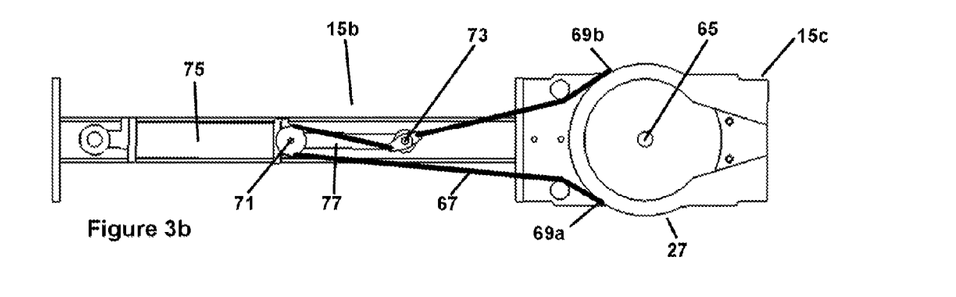
Figure 3C:
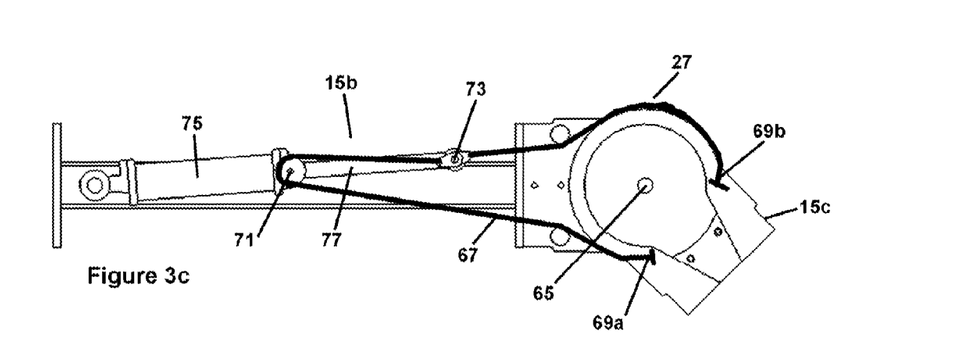

Representative hinge links for joining the Pelamis Boom elements 15*a-d* and Salter's Duck elements 27 *a-d*, as shown in FIG. 1, is shown and disclosed for a preferred embodiment and best mode, in FIGS. 3-5.

FIGS. 3*a, b* and *c*, show in greater detail, the interior of a preferred embodiment for Salter's Duck hinge element 27, connected to a Pelamis Boom element 15*c*, for example for rotation about the axis of rotation shown by numeral 65. In a novel way, according to the disclosed inventive principles, the transverse force of wave, for example in the direction of arrow 13, and with vertical energy in the direction of arrow 31, as shown in FIG. 1, causes the Pelamis System Boom element 15*c* to rotate about the pivot joint and axis of rotation 65 causing the cable 67 connected to boom Salter's Duck Element 27, at points 65*a-b* and to the piston rod 77 at piston rod end 73, and around pulley 71, to alternatively pull the piston rod 77 in a reciprocal motion compressing the fluid in hydraulic cylinder 75.

An alternative embodiment is shown in FIGS. 4*a-c*, where double or paired cables 67 are used in place of the single cable 67, shown in FIG. 3*a-c* and where the representative Salter's Duck hinge element 27 includes a transducer system for extracting the energy from a Salter's Duck Bade pair 33, as shown generally in FIG. 1 by Blade pairs 33 *a-b*, 33 *b-c*, 33 *d-e*, and 33 *f-g*. Blades 33 in FIG. 6, are shown rotating about shaft 59, as shown in FIG. 3, in the rotational direction shown by arrow 57, under the force of rotational waves 58, as shown in FIG. 6 *a-c* and in FIG. 5 *b*.

As shown and disclosed in a preferred embodiment, in FIGS. 5*a* and 5*b*, a crank handle 83 may be attached to shaft 59 for rotation in the rotational directions as shown by arrow 58 in FIG. 5*b* and in FIG. 6 *a-c*. The movement of the Salter's Duck Blade pairs 33, as shown in FIG. 1 and FIG. 2, rotates crank handle 83 about shaft 59 causing piston rod 85 to compress hydraulic fluid in hydraulic cylinder 81, as shown in and FIG. 5*b*.

A safe hinge cover is shown and disclosed according to the principles of the invention and for a preferred embodiment, in FIGS. 5a and 5b. As shown, a hinge cover, shown generally by numerals 91, in FIG. 5a, employs a stationary cover 97, over the hinge interior as shown in FIG. 5b and a moving hinge cover shown by numeral 93. The stationary hinge cover 97 is mounted relative to the moving hinge cover 93 for the moving hinge part 93 to rotate about the stationary hinge cover 97, and to be in contact with the stationary cover 97 at contact edge 95.

The contact of the stationary cover 97 and the moving hinge cover 93 at the moving cove contact edge 95 is adapted cover the stationary cover 97 so there are no spaces or openings at contact edge 95, for ocean fish or mammals to be caught or trapped, as the contact edge 95 moves relative to the stationary hinge cover 97, with the rotation of the moving hinge cover 93.

As would be known to those skilled in the art, the relative positions of the hinge covers 97 and 93 may be changed by positioning the hinge cover 93 to rotate inside the hinge cover 97, without departing from the disclosed inventive principles.

In FIGS. 6a, 6b, and 6c, a top view of a preferred embodiment of the Pelamis System Boom combined with the Salter's Duck Element, in motion under the influence of the motion of a transverse waves 32. As known to those skilled in the art, ocean wave energy is present in the form of rotational energy, as described above and shown by arrow 58, and as disclosed herein, causes the Salter's Duck blades 33 to rotate in the rotational directions of arrow 57 about the axis 59.

In a preferred embodiment, according to the disclosed inventive principles, an axis of rotation 66 of the respective Pelamis Boom elements 15 about Salter's Duck Hinge Element 27, under the force of transverse wave 13, is responsive to the transverse energy in wave 13, as shown by wave direction 32 in FIG. 6. As would be understood by those skilled in the art, wave 13 may possess vertical energy shown by arrow 31, in FIG. 1, by circular energy shown by arrow 58, in FIG. 6, and transverse energy as shown by arrow 32 in FIG. 6 or numeral 13 in FIG. 1.

As would be understood by those skilled in the art, and as explained with reference to FIG. 1, above, the hinge elements, for example 27a-d, in the preferred embodiment as shown in FIG. 1 may be added to provide hinges for vertical or transverse rotational movement of the respective connected Pelamis System Boom Elements 15 a-d, relative to the Salter's Duck hinge Eeements 27a-d, under the force of vertical and transverse energy in direction 31 and 13, as shown in FIG. 1.

What has been shown and disclosed is a unitary system for extracting energy in ocean waves having transverse vertical, and rotational, elements. As would be understood by those skilled in the art, the disclosed inventive principles, as shown for a preferred embodiment, allow energy present in at least two orthogonal axes and in at least one rotational axis to be extracted by the combination of a Pelamis system boom elements and by the rotating blades in a Salter's Duck. As would be known to those skilled in the art, the embodiments disclosed herein may be varied without departing from the disclosed inventive principles.

The invention claimed is:

1. A system for extracting long wavelength ocean wave energy and for extracting rotational wave energy; comprising,
 a plurality of boom elements extending in a longitudinal axis;
 at least one hinge element;
 said plurality of boom elements connected to said at least one hinge element for movement about said hinge element in a direction of the vertical force of a wave or for movement about said hinge element in a direction of the transverse force of a wave; and
 wherein, said hinge element includes a shaft transverse said boom elements longitudinal axis; and
 at least one blade mounted to said shaft for rotational movement of said shaft in the direction of the rotational force of a wave; including a cable connected to said hinge element to at least two points on said hinge;
 a first hydraulic transducer including a first hydraulic cylinder, a first hydraulic piston and a first hydraulic piston rod;
 a second hydraulic transducer including a second hydraulic cylinder, a second hydraulic piston and a second hydraulic piston rod;
 said cable is connected to said first and said second hydraulic piston rods; and
 wherein said rotational movement about said hinge element in a direction of the vertical force of a wave or in the direction of the transverse force of the wave is adapted to rotate said cable about said hinge element and to alternatively pull said first and second hydraulic piston rod and said first and second hydraulic piston in a reciprocal motion.

2. The system of claim 1, including a pulley mounted on said hydraulic cylinder; and
 wherein said cable is connected from a first point on said hinge element to said first hydraulic piston rod and around said pulley and to a second point on said hinge element.

3. The system for claim 2, wherein said first or second means includes means for moving said first hydraulic transducer in response to said vertical force in said wave or in response to said transverse force in said wave; and means for moving said second hydraulic transducer in response to said rotational force in said wave.

4. A system for extracting long wavelength ocean wave energy and for extracting rotational wave energy; comprising,
 a plurality of boom elements extending in a longitudinal axis;
 at least one hinge element;
 said plurality of boom elements connected to said at least one hinge element for movement about said hinge element in a direction of the vertical force of a wave or for movement about said hinge element in a direction of the transverse force of a wave; and
 wherein, said hinge element includes a shaft transverse to said boom elements longitudinal axis; and
 at least one blade mounted to said shaft for rotational movement of said shaft in the direction of the rotational force of a wave;
 and including a safe hinge element cover;
 said safe hinge element cover including a stationary hinge element cover mounted over said hinge element; a moving hinge element cover; said moving hinge element cover including a moving hinge element cover edge; said moving hinge element cover mounted on said hinge element for rotational movement about said stationary hinge element cover and wherein said moving hinge element cover is adapted to rotate relative to the position of said stationary hinge element cover, with said moving hinge element cover edge in contact with said stationary hinge element cover.

* * * * *